United States Patent
Leyden

(10) Patent No.: US 9,661,942 B2
(45) Date of Patent: May 30, 2017

(54) SHOPPING CART CHECKOUT LOCATION WITH MIRROR TO REFLECT IMAGE OF CART CONTENTS

(71) Applicant: Se-Kure Controls, Inc., Franklin Park, IL (US)

(72) Inventor: Roger J. Leyden, Inverness, IL (US)

(73) Assignee: Se-Kure Controls, Inc., Franklin Park, IL (US)

(*) Notice: Subject to any disclaimer, the term of this patent is extended or adjusted under 35 U.S.C. 154(b) by 0 days.

(21) Appl. No.: 14/940,275

(22) Filed: Nov. 13, 2015

(65) Prior Publication Data
US 2017/0035220 A1    Feb. 9, 2017

Related U.S. Application Data

(60) Provisional application No. 62/202,311, filed on Aug. 7, 2015.

(51) Int. Cl.
*A63F 9/02* (2006.01)
*A47F 9/04* (2006.01)
*G02B 5/10* (2006.01)

(52) U.S. Cl.
CPC .................. *A47F 9/04* (2013.01); *G02B 5/10* (2013.01); *A47F 2009/041* (2013.01)

(58) Field of Classification Search
CPC .. A47F 9/046; A47F 9/00; A47F 9/041; A47F 9/045; A47F 9/047; A47F 9/048; A47F 2009/041; A47F 9/005; A47F 9/02; A47F 9/04; G06Q 20/20; G06Q 20/208; G07G 1/0036; G07G 1/0045; G07G 1/0054; G07G 1/0063; G07G 1/0072; G07G 1/0081; G02B 5/10
(Continued)

(56) References Cited

U.S. PATENT DOCUMENTS 3,725,894 A * 4/1973 Geisler ............... G08B 13/183
340/568.5
4,549,790 A * 10/1985 Harris, Jr. .............. B60R 1/008
248/477
(Continued)

OTHER PUBLICATIONS

"Refletion Products" from the internet archive "wayback machine" dated Oct. 20, 2013.*
(Continued)

*Primary Examiner* — Jeffrey Shapiro
(74) *Attorney, Agent, or Firm* — Wood, Phillips, Katz, Clark & Mortimer

(57) ABSTRACT

The combination of a shopping cart and a checkout location. The shopping cart has a wheeled frame defining: a) a primary article storage receptacle; and b) a lower storage shelf. The checkout location has: a) an aisle through which the shopping cart can be directed and with laterally spaced sides; b) a processing assembly at one side of the aisle; c) a station at which a person can be situated to operate the processing assembly; and d) a mirror on the other side of the aisle situated so that a person situated at the station can observe a reflection of articles placed on the storage shelf. The mirror has a reflective surface configured and located to reflect an image of the shopping cart only below the top of the shopping cart from a vantage point of a person situated at the station.

22 Claims, 7 Drawing Sheets

(58) Field of Classification Search
USPC .................................... 186/59–69; 235/383
See application file for complete search history.

(56) References Cited

U.S. PATENT DOCUMENTS

| | | | | |
|---|---|---|---|---|
| 4,687,305 | A * | 8/1987 | Harris, Jr. ............ | G02B 7/1824 248/479 |
| 4,813,758 | A * | 3/1989 | Sanders ................. | E04H 6/426 116/28 R |
| 5,084,785 | A * | 1/1992 | Albers ................... | B60R 1/002 359/868 |
| 5,179,464 | A * | 1/1993 | Morita ................... | G02B 5/09 359/216.1 |
| 7,165,854 | B1 * | 1/2007 | Liu ......................... | G02B 5/08 248/466 |
| 7,210,804 | B2 * | 5/2007 | Shih ....................... | G02B 5/08 248/475.1 |
| 2007/0047114 | A1 * | 3/2007 | Shih ....................... | G02B 5/08 359/866 |
| 2010/0044157 | A1 * | 2/2010 | Marshall ............. | G07G 1/0036 186/61 |

OTHER PUBLICATIONS

"Police: Man Used Mirror in Shopping Cart to Look Up Woman's Dress" by Matthew Stabley, published Aug. 8, 2013 on www.nbcwashington.com.*

"Candle Power Forums, Rearview Mirror Frustration" website, a.k.a., (RMF), dated Aug. 4, 2011, 05:51 AM.*

* cited by examiner

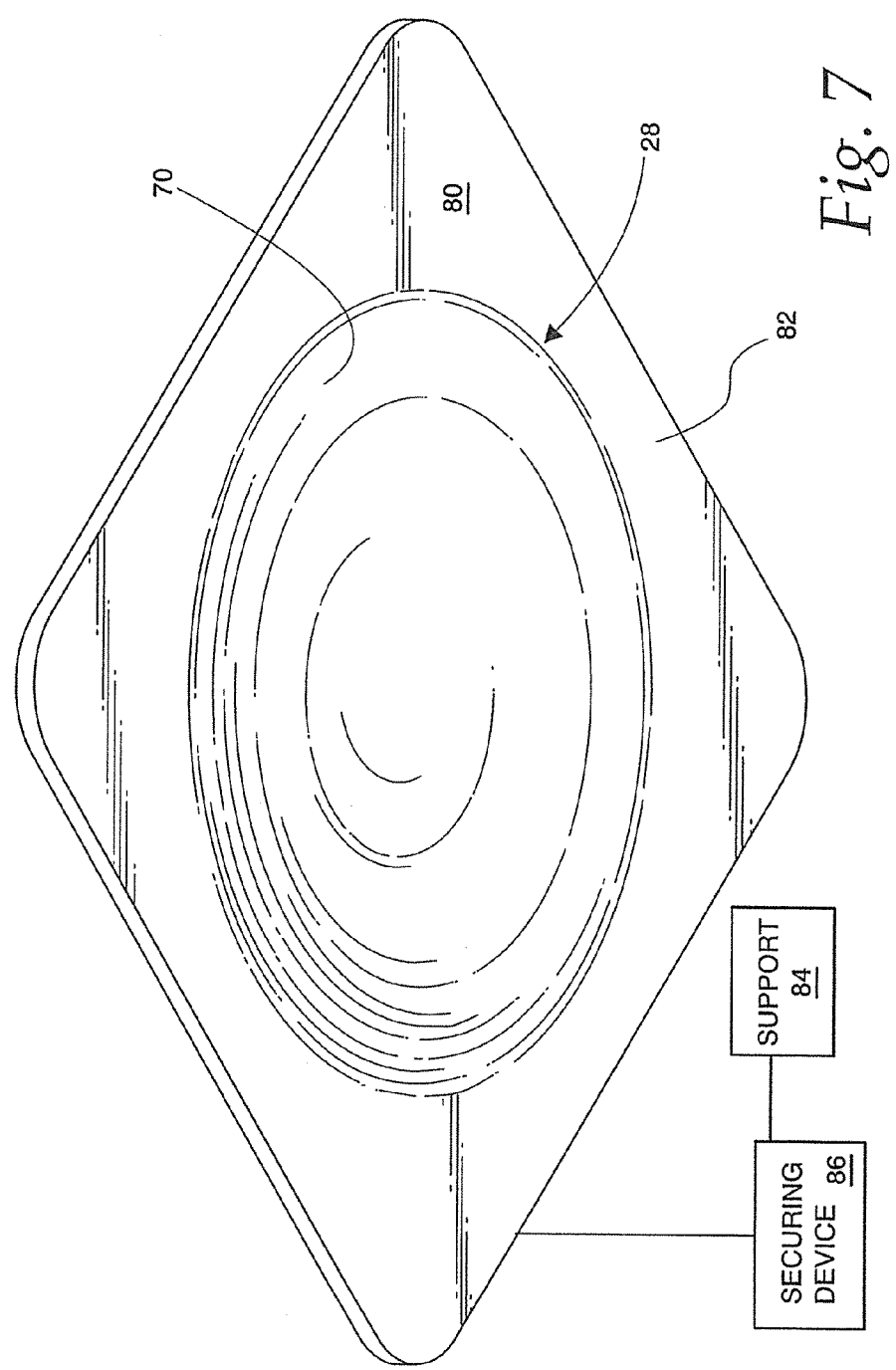

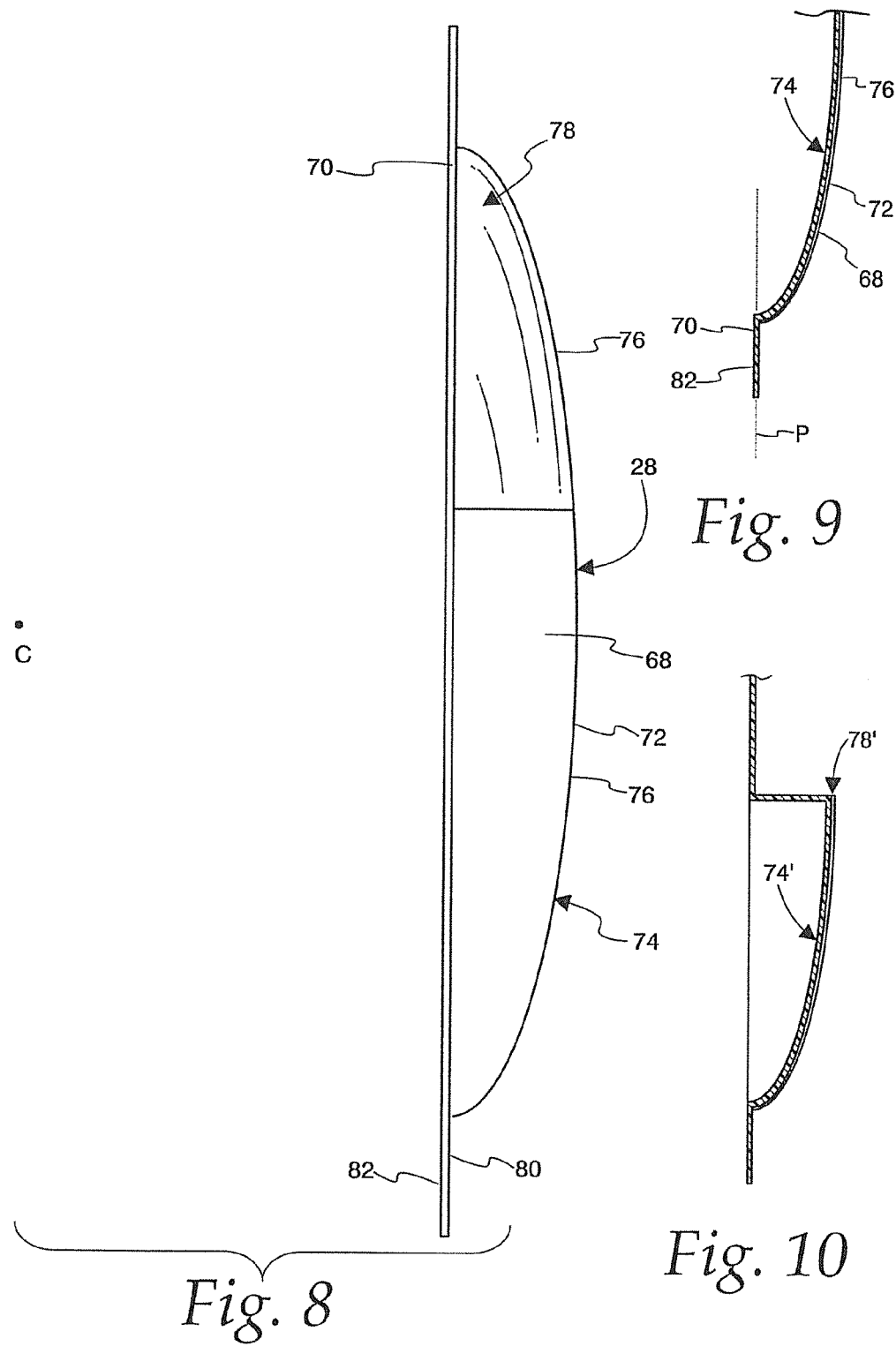

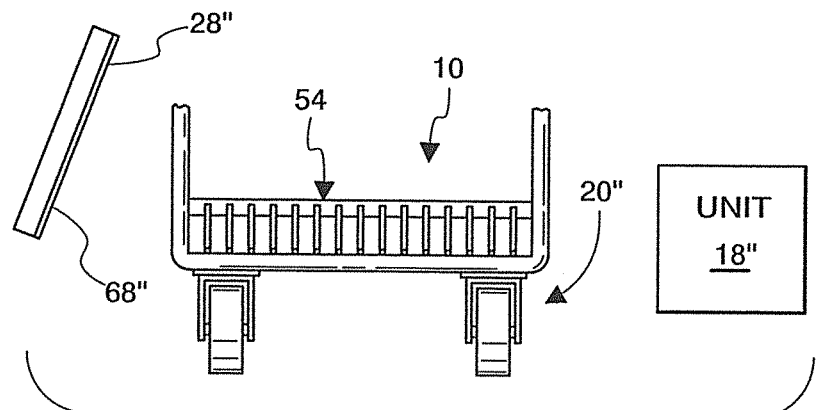
Fig. 11
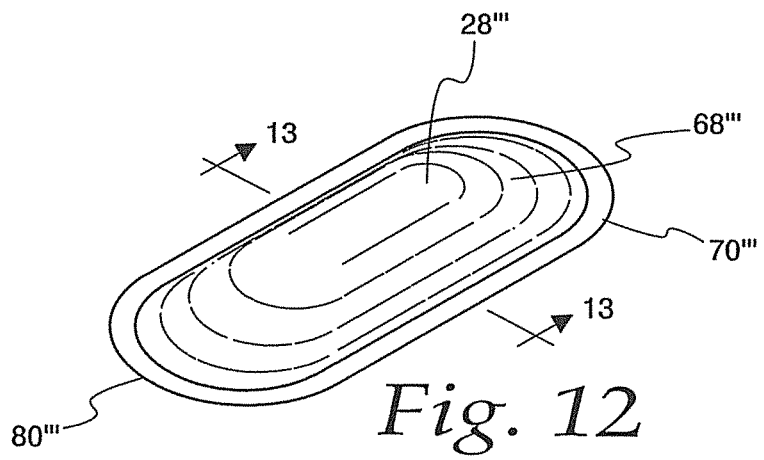
Fig. 12
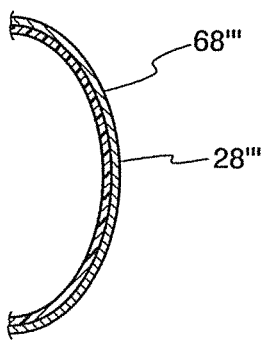
Fig. 13
Fig. 14

SHOPPING CART CHECKOUT LOCATION WITH MIRROR TO REFLECT IMAGE OF CART CONTENTS

BACKGROUND OF THE INVENTION

Field of the Invention

This invention relates to shopping carts and, more particularly, to checkout locations at which the amount owing for the contents of a shopping cart is identified for a consumer.

Background Art

In many different types of businesses in which consumers accumulate their own selection of articles for purchase, a shopping cart is used that has a main frame that is supported on wheels and a handle that can be grasped by a user and manipulated to propel and steer the cart. A main basket or receptacle is provided forwardly of the handle and is situated to allow a user to conveniently place articles therein as they are progressively removed from shelves, or the like. Below the main receptacle, a shelf is provided for the support of additional articles. The structure supporting the shelf reinforces the frame and provides a solid base to support potentially large and relatively heavy objects.

Typically, businesses will provide checkout units near exit locations. The units vary in terms of the details of how they are configured. However, generally they each define an aisle through which shopping carts can be advanced. With a cart in a checkout position in an aisle, it is situated adjacent a processing assembly operable by an individual standing at an adjacent station. That individual commonly will record the price of each of the articles through conventional scanning-type technology and eventually accumulate the scanned articles for transportation from the business in bags or boxes.

Many businesses are set up for high volume product turnover. Long lines and slow individual processing can be a deterrent to shopping at a particular business. The same speed at checkout that contributes to a better consumer experience also at times causes revenue loss through either inadvertent oversight on the part of a checkout person or theft.

A common problem arises with articles stored on the lower shelf of the shopping cart. The configuration of each checkout unit is such that the checkout person in a standing position at his/her station can conveniently view and potentially handle articles in the upper basket. However, the articles on the lower shelf may be difficult to view unless special care is taken, even though the upper basket is normally made from a see-through, mesh material. This problem is aggravated by the fact that cart aisles are purposely made very narrow to most efficiently utilize valuable floor space. Thus, the option does not exist to shift the cart laterally towards the side opposite that to which the checkout person is located to give that person a better vantage point to view the region under the main basket.

A checkout person in a hurry is likely to miss at least a handful of articles on lower shelves during the course of a day when potentially hundreds of transactions may occur. A would-be thief may also strategically position articles so that it is difficult for the checkout person to conveniently see them on a lower shelf. This problem is aggravated by the fact that consumers may inadvertently fail to present articles on a lower shelf for price scanning and such conduct is typically treated as an innocent act to maintain good customer relations. Thus, a would-be thief has a minimal risk of facing any consequences, even if caught in the act of attempting a theft.

One attempted solution to the above problem has been to place a convex mirror on a structure on the side of the aisle opposite that occupied by the checkout person. The mirror is configured and located so that the checkout person at his/her station can observe a reflected image of the entire height of the shopping cart, including any articles on a lower shelf. While the use of mirrors does effectively address the above problem and make the contents of the lower shelf readily observable to a checkout person, it has been rejected by businesses as intrusive to people's privacy.

More particularly, a convex mirror will reflect an image of the entire cart and the adjacent consumer from a side perspective. That image will include the consumer's body region from the feet potentially to the neck area. Viewing of this image may be offensive to people having clothing fully covering this body region. However, it is potentially more intrusive and offensive to persons wearing limited, or certain revealing types, of clothing.

In the interest of respecting the privacy interests of its consumers, businesses have thus avoided the use of such convex mirrors and have contended with the loss of revenue resulting from missed articles at checkout. In high volume operations, while the individual losses may be insignificant, the accumulation of the same can have serious economic consequences.

The industry continues to seek out ways to avoid missed articles at checkout while at the same time efficiently dealing with consumers during the checkout process to add to the consumer experience.

SUMMARY OF THE INVENTION

In one form, the invention is directed to the combination of a shopping cart and a checkout location. The shopping cart has a frame supported on a plurality of wheels and defines: a) a primary storage receptacle in which articles to be purchased are placed; and b) a storage shelf below the primary storage receptacle upon which additional articles to be purchased can be placed. The checkout location has: a) an aisle through which the shopping cart can be directed in a path to and from a checkout position; b) a processing assembly at one side of the aisle; c) a station at which a person can be situated to operate the processing assembly to identify information on articles from the shopping cart in the aisle; and d) a mirror on the other side of the aisle situated so that a person situated at the station can observe a reflection of articles placed on the storage shelf as the shopping cart is directed through the aisle path. The mirror has a reflective surface configured and located to reflect an image of the shopping cart only below the top of the shopping cart from a vantage point of a person situated at the station as the shopping cart is directed through the aisle path.

In one form, the reflective surface is convexly shaped.

In one form, the mirror has a body on which a reflective coating is applied to define the reflective surface.

In one form, the body has a convex portion projecting away from a reference plane. Only a portion of the convex portion has a reflective coating thereon exposed to reflect an image.

In one form, the convex portion is defined by an arc with a constant radius from a center point. The arc is interrupted at a location spaced from the reference plane.

In one form, the convex portion is defined substantially by an arc with a constant radius from the center point.

In one form, the convex portion is defined by a portion of a sphere truncated by transverse planes.

In one form, the body has a frame extending fully around the convexly shaped reflective surface.

In one form, the frame defines a substantially flat mounting surface.

In one form, the mirror is made from a non-metal material.

In one form, the processing assembly has a scanner for UPC codes on articles that can be placed in the shopping cart.

In one form, the convex portion is substantially entirely covered with the reflective coating. An area of the reflective coating on the convex portion is masked so that an image of an object will not be reflected at the masked area.

In one form, the reflective surface is circumscribed by a diameter in the range of 5-10 inches.

In one form, the diameter is on the order of 8 inches.

In one form, the shopping cart has a front and rear. The mirror is configured to reflect an image having a dimension along the path not significantly greater than a front-to-rear dimension of the shopping cart from a vantage point of a person situated at the station.

In one form, the body is shaped as a segment of a sphere.

In one form, the body is shaped so that the body has one of an elliptical and a parabolic shape as seen in a planar cross section.

In one form, the reflective surface has a flat shape.

In one form, an area of the reflective surface is masked so that an image of an object will not be reflected at the masked area.

In one form, less than 50% of an entire area of the reflective surface is masked.

BRIEF DESCRIPTION OF THE DRAWINGS

FIG. 7 is an enlarged, rear, perspective view of the mirror shown in FIGS. 3-6;

FIG. 8 is an enlarged, side, perspective view of the mirror shown in FIGS. 3-7;

FIG. 9 is an enlarged, fragmentary, cross-sectional view of the mirror taken along line 9-9 of FIG. 5;

FIG. 10 is a view as in FIG. 9 of a modified form of mirror, according to the invention;

FIG. 11 is a partially schematic, fragmentary, elevation view of a further modified form of mirror, according to the invention, in relationship to a unit at a checkout location and with a portion of a shopping cart in an aisle between the mirror and unit;

FIG. 12 is a perspective view of a further modified form of mirror, according to the invention;

FIG. 13 is a fragmentary, cross-sectional view of the mirror taken along line 13-13 of FIG. 12; and FIG. 14 is a schematic representation of a reflective surface, according to the present invention, and encompassing different convex shapes for a reflective surface on the inventive mirror.

DETAILED DESCRIPTION OF THE PREFERRED EMBODIMENT

Figure 1:
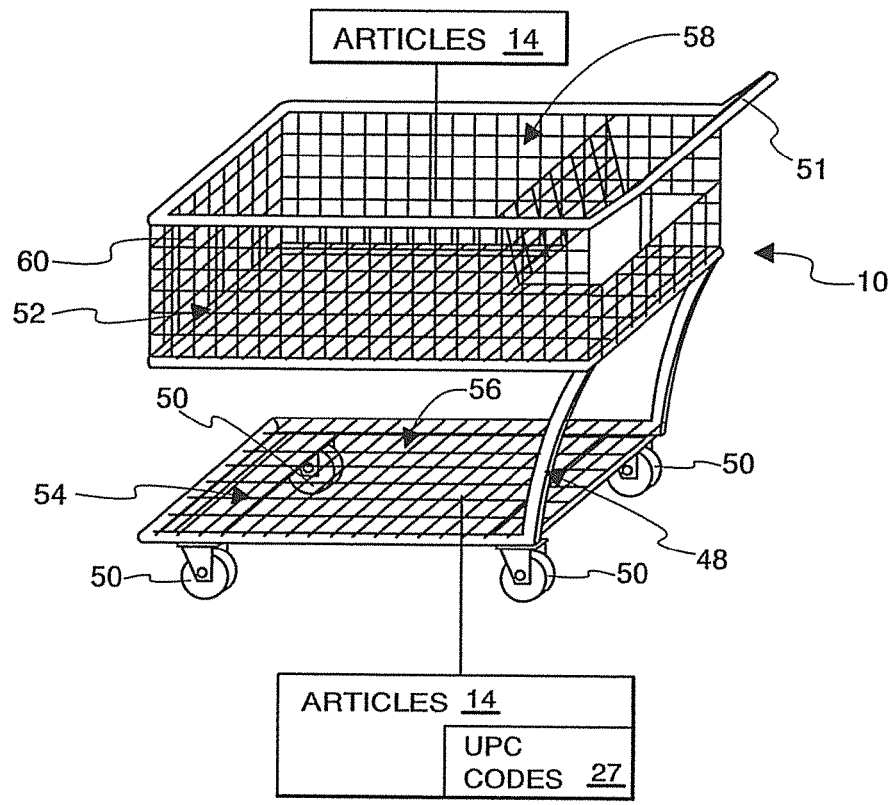
FIG. 1 is a perspective view of one form of conventional shopping cart.
Figure 2:
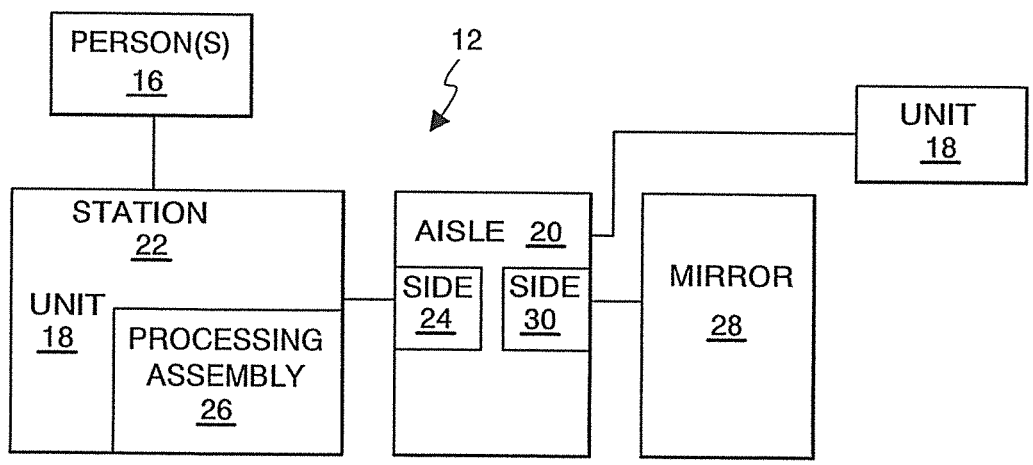
FIG. 2 is a schematic representation of a checkout location, according to the invention, that accommodates a cart as in FIG. 1 and has a mirror that facilitates observation by a checkout attendant of articles on a lower shelf on the cart.

The present invention relates to a conventional type shopping cart, shown at 10 in FIG. 1, configured to be directed up to and through a store checkout location, as shown schematically at 12 in FIG. 2. The checkout location 12 is typical of those provided at a multitude of different types of businesses that allow consumers to accumulate articles 14 in the shopping cart 10 and advance the accumulated articles 14 through the shopping cart 10 to the checkout location 12, whereat persons 16 employed by the business complete a purchase transaction.

At the checkout location 12, typically multiple units 18 of like construction will be arranged in a side-by-side relationship with an aisle 20 therebetween through which a consumer advances the shopping cart 10.

An exemplary unit 18 consists of a station 22 where one person 16 can reside, typically in a standing position on one side 24 of the aisle 20. Once situated at the station 22, the person 16 can operate a processing assembly 26 to identify information on the articles 14. Typically, the processing assembly 26 will include a scanner that will read UPC codes 27 (FIG. 1) on the articles 14 to identify a purchase price for each such article 14.

According to the invention, and for reasons that will be explained in greater detail hereinbelow, a mirror 28 is provided at or adjacent to the other side 30 of the aisle 20, thereby to reflect an image of articles 14 in the shopping cart 10 to be viewable by the person 16 on the aisle side 24 at the station 22.

Figure 3:
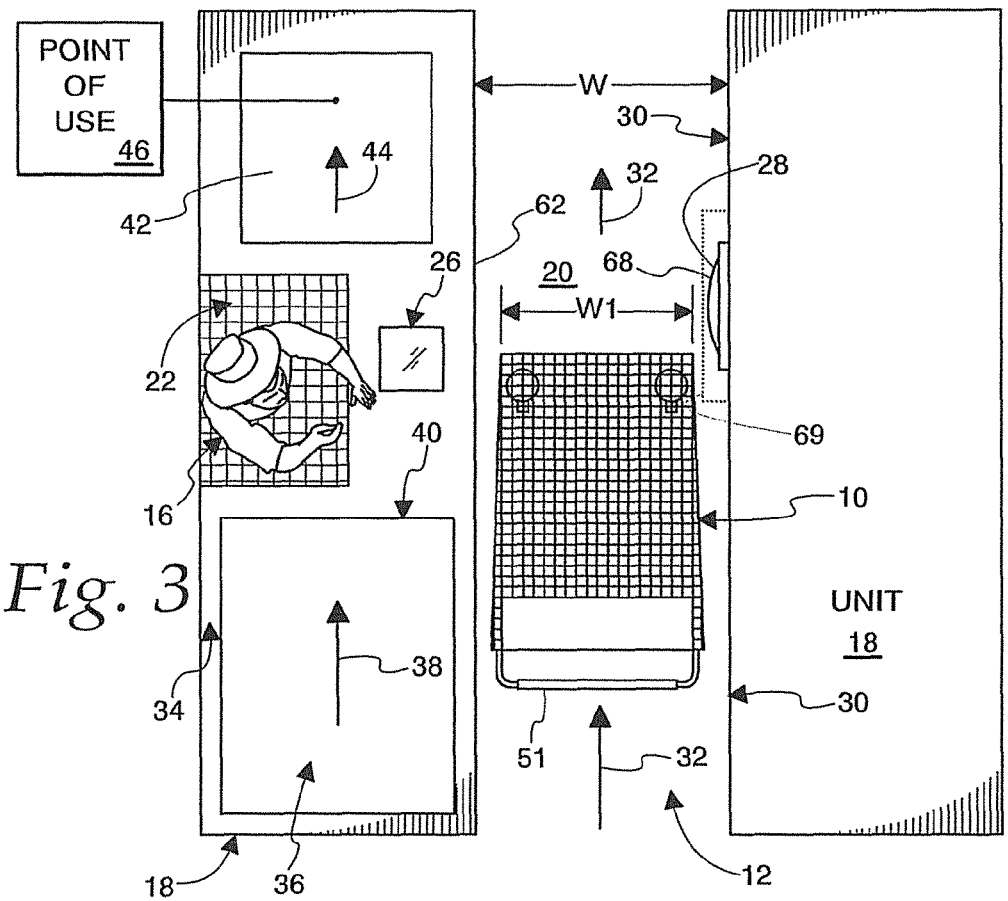
FIG. 3 is a plan view of one specific form of checkout location, as shown in FIG. 2, and with the shopping cart in FIG. 1 in a checkout position.

In FIG. 3, one specific, exemplary form of checkout location is shown at 12 consisting of two units at 18, with details shown for one of the units 18 and the other shown schematically. The aisle 20 formed between the units 18 has a width W that is slightly greater than the width W1 of the shopping cart 10 that is directed therethrough in a substantially straight path as indicated by the arrows 32.

The unit 18 shown in detail has an open space defining the station 22 at which the person 16 resides in a standing, or potentially a seated, position wherein the top region of the shopping cart 10 passing through the aisle 20 is readily visible.

The unit 18 has an upwardly facing countertop 34 that wraps around the space/station 22. In this particular embodiment, the processing assembly 26 is in the form of a scanner which is conveniently accessible to the person 16 residing at the space/station 22.

In this embodiment, a feed conveying belt at 36 moves in an endless path to advance articles 14 from the cart 10 placed thereon in the direction of the arrow 38 up to a location at 40 where they are accumulated to be conveniently grasped and thereafter scanned by the person 16 utilizing the processing assembly 26. Once the scanning is completed, the person 16 directs the scanned article onto a separate conveying belt 42 which advances the articles 14 further in the direction of the arrow 44 to an end point of use 46 where they are accumulated and/or picked up and appropriately placed as in the cart 10, bags, and/or boxes (not shown) for convenient transportation of the articles 14 from the inside store location, as to an outside vehicle.

The cart configuration shown in FIG. 1 is typical of those used at the checkout location 12 as shown in FIG. 3. The cart 10 has a main frame 48 supported on a plurality of wheels 50. A graspable handle 51 is usable to advance and steer the cart 10. A primary storage receptacle/basket 52 is mounted at the upper region of the frame 48 and has a generally upwardly opening, cup shape to conveniently receive and retain the articles 14 placed therein by a consumer.

A separate storage shelf at 54, below the receptacle 52, is configured to define an upwardly facing surface 56 to support additional articles 14 that a consumer may wish to purchase. Use of the shelf 54 may be desirable for heavy articles 14, large articles 14, or merely to handle an excess of articles 14 that do not fit in the primary storage receptacle 52.

Typically, a storage space 58 in the receptacle 52 is bounded by a mesh material 60 that has an opening pattern that allows the surfaces thereof to be seen through with relative ease.

The vertical dimension of the cart 10 is such that the primary receptacle 52 is generally at the height of the countertop 34 (FIG. 3) so that the person 16 at the space/station 22 can readily view the contents thereof and, if necessary, place articles 14 therein and remove the same therefrom.

Typically, a vertical wall 62 and/or the countertop 34 blocks direct viewing of the lower storage shelf 54 from the vantage point of the person 16 standing at the space/station 22 with the cart 10 in a checkout position, that is actually a range of different positions along the length of the aisle 20 leading up to and extending past where the person 16 stands. Rather, the person 16 can generally directly observe the contents of the storage shelf 54 only by leaning over the cart 10 to look downwardly through the primary storage receptacle 52. Because of the inconvenience of this type of movement, and the delay it may incur, most persons 16 forego a visual inspection of the shelf 54 through a direct line of sight observation, relying upon the consumer to present all articles 14 on the shelf 54 for scanning. As a consequence, articles 14 may be left on the storage shelf 54 as checkout occurs, either inadvertently or with the intent that they be unobserved, as a result of which they are ultimately removed from the store location without being accounted for.

Figure 4:
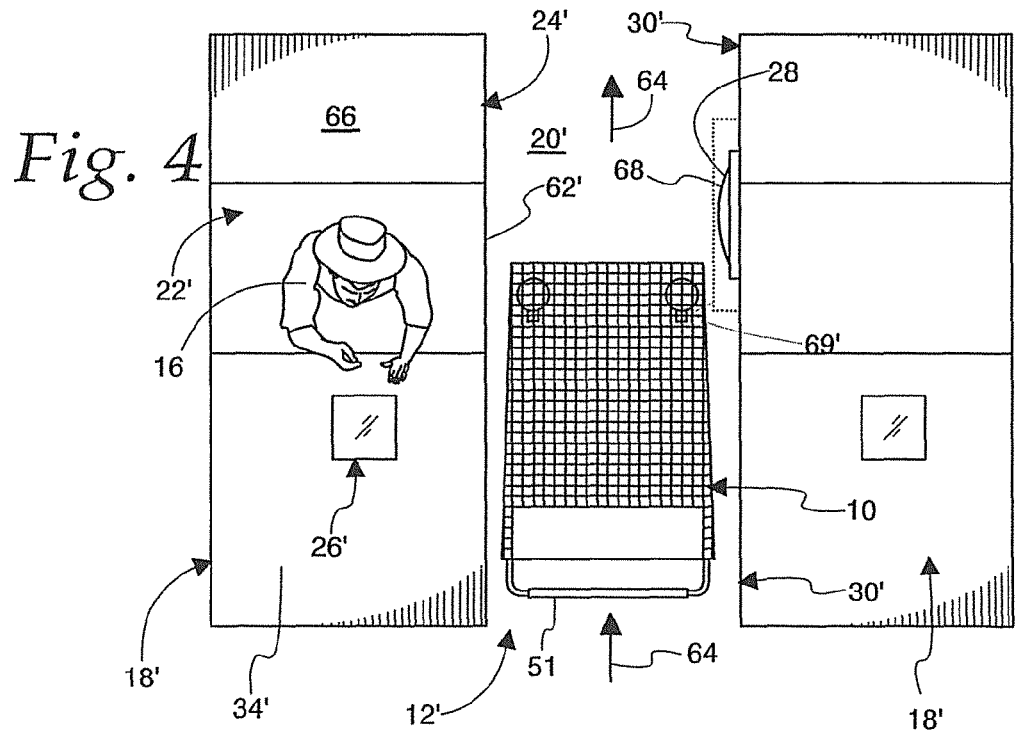
FIG. 4 is a view as in FIG. 3 and showing a modified form of checkout location.
Figure 5:
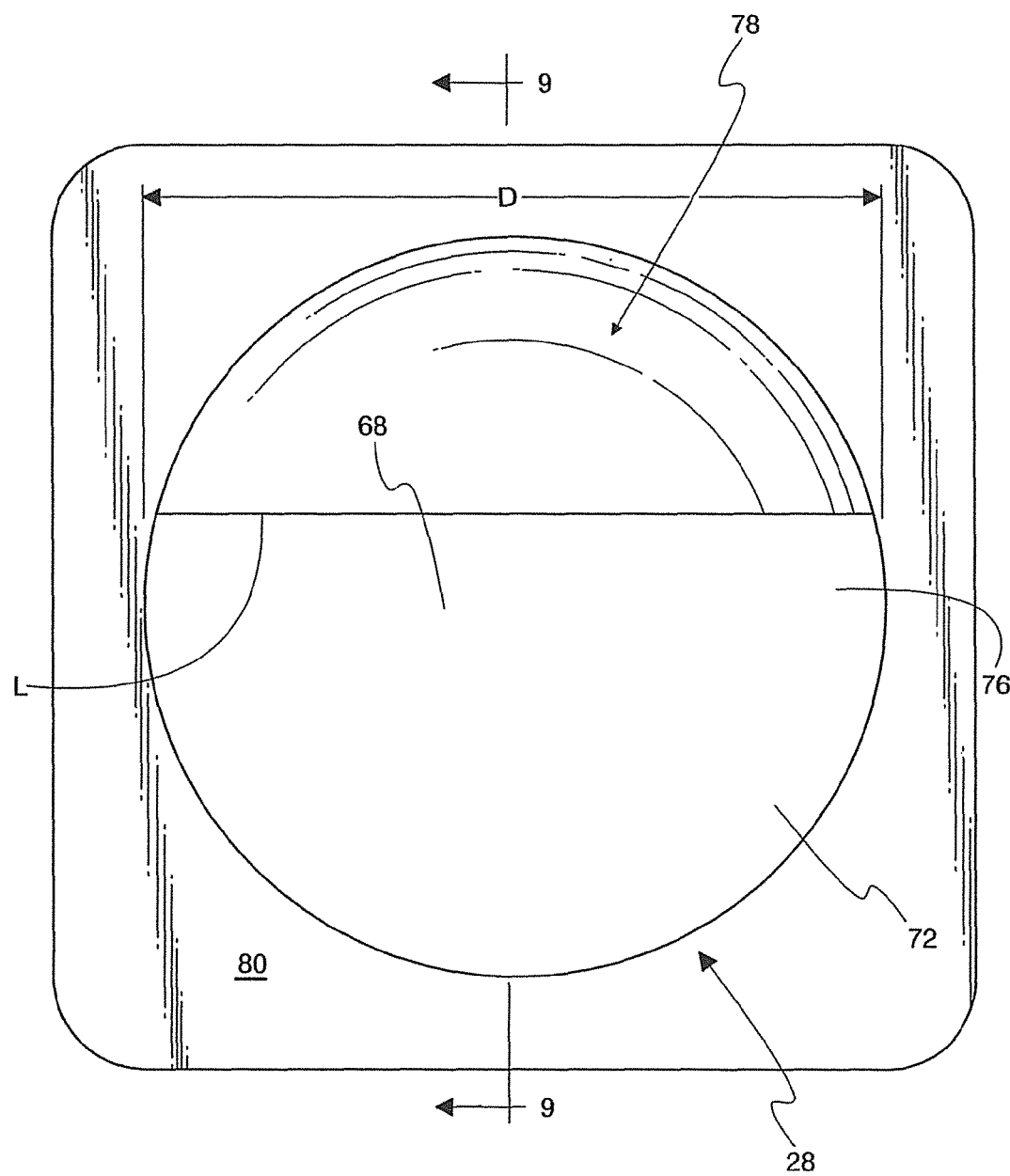
FIG. 5 is an enlarged, elevation view of the inventive mirror as shown on the checkout locations in FIGS. 3 and 4.
Figure 6:
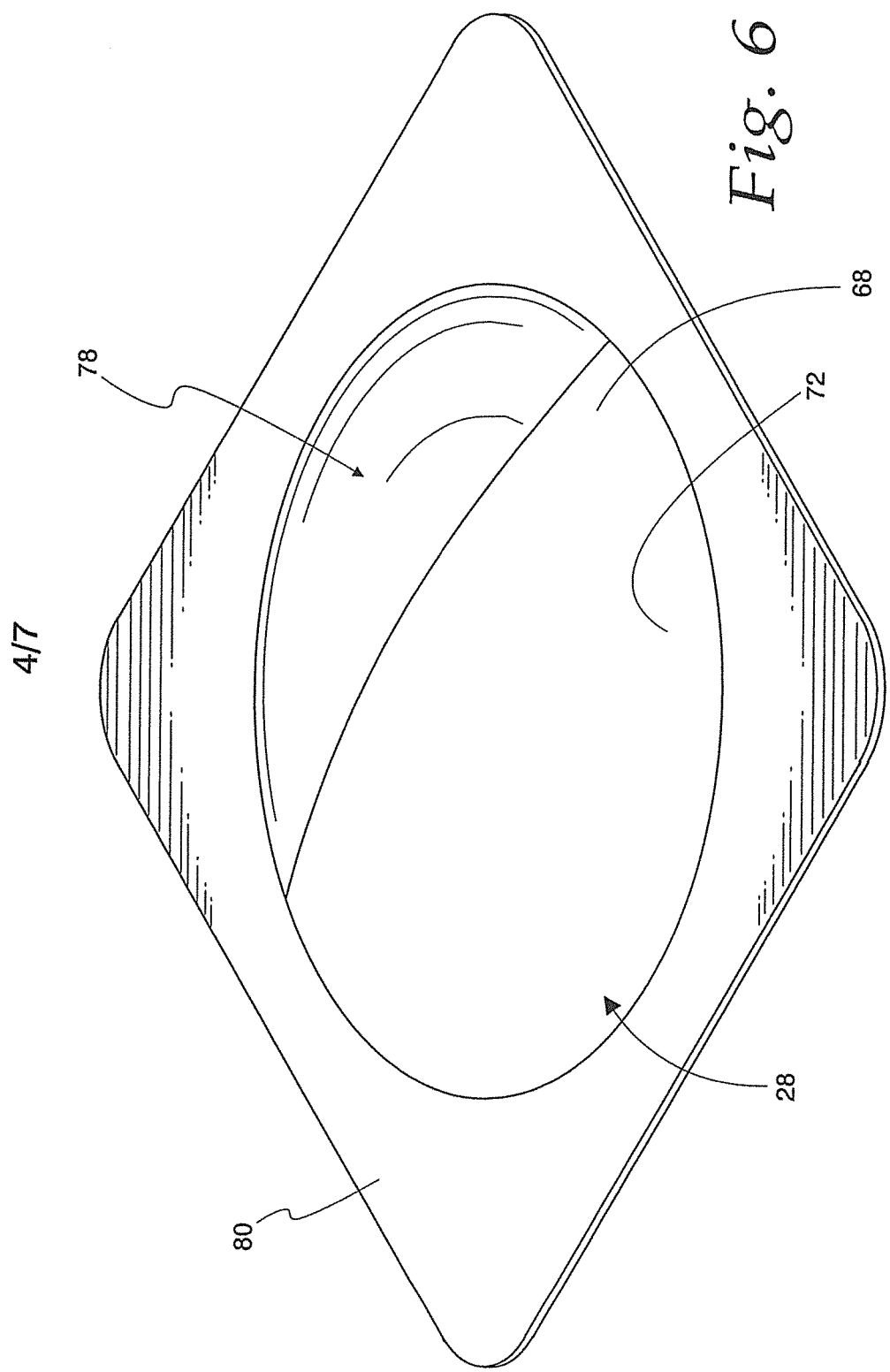
FIG. 6 is an enlarged, perspective view of the mirror in FIGS. 3-5.

FIG. 4 shows an alternative arrangement of conventional checkout location at 12'. The checkout location 12' has two separate units 18' depicted between which an aisle 20' is defined. The cart 10 is advanced in a path through the aisle 20', as indicated by the arrows 64.

In this embodiment, a fixed countertop 34' supports articles 14 being handled. A person 16 resides at the space/station 22', normally in a standing position, but potentially in a seated position, and is situated so as to conveniently strategically position articles 14 relative to the processing assembly 26', that may include a scanner. The person 16 is situated to allow convenient access to articles 14 in the cart 10 and on the countertop 34', whereby the person 16 can conveniently effect transfer of scanned articles from the countertop 34' back into the cart 10. Alternatively, a counter extension 66 may support the scanned articles 14. The accumulated, scanned articles 14 on the counter extension 66 can then be put in boxes, bags, or back into the cart 10 at that location by the same person 16 and/or another person.

With this unit design, a vertical wall 62' resides at one side 24' of the aisle 20' and, as the aforementioned vertical wall 62', guides movement of the cart 10 in its intended path. At the same time, this vertical wall 62' provides a barrier to direct viewing of the storage shelf 54 on the cart 10 in the checkout position by the person from that person's vantage point at the station 22'.

According to the invention, the mirror 28 is shown in FIGS. 3 and 4 placed in the vicinity of the aisle sides 30, 30', as on the units 18, 18', and is configured so that persons situated at the stations 22, 22' can observe a reflection of articles 14 placed on the storage shelf 54 of an adjacent cart from a vantage point that the person has while normally manning the station 22, 22'.

Each mirror 28 has a reflective surface 68 configured and located to reflect an image of the shopping cart 10 only below the top of the shopping cart 10, from a vantage point of the persons 16 situated at the stations 22, 22', as the shopping cart is directed through the aisles 20, 20'. Bumpers 69, 69' project laterally past the mirrors 28 to prevent contact between the cart 10 in the aisles 20, 20' and the mirrors 28.

The invention contemplates a multitude of different mirror configurations. One exemplary form is shown at 28 in FIGS. 3 and 4 and in greater detail in FIGS. 5-9. The reflective surface 68 is convexly shaped. The invention contemplates virtually a multitude of different convex shapes for the reflective surface that may have different geometries. The specific configurations shown herein are exemplary in nature only.

The mirror 28 is made up of a body 70 upon which a reflective coating 72 is applied to define the reflective surface 68. The body 70 has a convex portion at 74 projecting away from a reference plane P. The convex portion 74 has the reflective coating 72 thereon.

It should be mentioned that the reflective surface 68 does not require that there be a separate coating. In its broadest sense, the invention contemplates use of any structure, whether made up of a single or multiple layers, that has an exposed surface that is reflective. The depicted form utilizes a non-metal material for each of the body 70 and reflective coating 72. However, metal materials could be used. The precise manner of making the mirror and forming the reflective surface 68 are not critical to the invention.

The precise curvature of the convex portion 74 may vary significantly. In one form, substantially the entirety of the convex portion 74 is defined by an arc with a constant radius from a center point C.

The convex portion 74 of the body 70 may be shaped as a segment of a sphere.

With a convex shape as described above, controlling of the image may be effected in a number of different manners. In one form, the reflective coating 72 may be exposed at only a part of the total area of the convex shape of the exposed surface 76 on the convex portion 74. A top area at 78, by reason of being non-reflective, prevents image reflection of the upper region of the cart 10 that could otherwise be observed by the person 16 at the station 22, 22'. This area at 78 is strategically selected to control the image reflection so that certain regions of a customer's body pushing the cart 10 are not reflected so as to be viewable by the person 16. These regions are preferably ones most sensitive to observation, such as upper torso region and upper leg regions, particularly when a consumer is wearing a skirt or shorts. Horizontal image control may also be practiced as to limit the reflected image dimension to be approximately equal to, or less than, the front-to-rear dimension of the cart 10.

Controlling of the area of reflection of the surface 76 can be effected by providing no reflective coating 72 in that area 78. Alternatively, the area at 78 can be masked by a composition that will not allow generation of a reflected image in the area 78. As shown, the area 78 is less than 50% of the overall area of the surface 76. A straight line L separates the reflective and non-reflective areas. However, the precise shape of the boundary line is a design consideration.

Alternatively, as shown in FIG. 10, the desired non-reflective body area can be removed, as shown at 78', thereby varying the overall geometry of the convex portion 74', corresponding to the convex portion 74, described above.

In a design wherein the convex portion 74 is defined by an arc with a constant radius from a center point over at least a portion thereof, the arc may be interrupted at a location spaced from the reference plane P. This may be effected in a number of different ways; in one form by providing a shape for the surface 76 that is a portion of a sphere truncated by transverse planes.

The body 70 is integrated into, or one piece with, a frame 80 that fully surrounds the convex portion 74 and defines a flat mounting surface 82 at the back of the body 70. The mounting surface 82 may be placed against a suitable support 84 and secured thereto by any conventional securing device 86. The securing device 86 may be one or more fasteners, an adhesive layer, etc.

In FIG. 11, a further modified form of mirror is shown at 28" in relationship to a storage shelf 54 on the cart 10, with the cart 10 adjacent to a unit 18" on one side of the aisle 20". In this embodiment, the mirror 28" has a flat reflective surface 68" that is angled so that primarily the region at, and slightly above, the storage shelf 54 is viewable from a person normally manning the unit 18".

In an alternative mirror configuration, as shown at 28''' in FIGS. 12 and 13, the convex portion of a mirror body 70''' has a generally oval shape with a major axis extending horizontally. In cross-section, a reflective surface 68''' has a generally parabolic shape. The mirror 28''' has an associated mounting frame 80'''.

The details of construction for the mirror 28''' can be arrived at based upon the desired reflected image. The desired boundaries of the image are determined by the curvature and dimensions of the reflective surface 68''', as well as the precise location of the mirror 28''' relative to a cart 10 in the associated aisle.

As shown in schematic form in FIG. 14, the invention contemplates a reflective surface $68^{4+}$ that may have other cross-sectional shapes, including elliptical, parabolic, etc. The schematic showing is intended to encompass virtually an unlimited number of such different shapes.

Generally, for all mirror configurations, the reflected image generated can be controlled by strategically selecting the shape, size, and location of the particular reflective surface.

For example, the reflective surface 68 may have a diameter D in the range of 5-10 inches. In one preferred form, the diameter D is on the order of 8 inches with a non-round shape. The reflective surface may be circumscribed by a diameter in this same range.

The foregoing disclosure of specific embodiments is intended to be illustrative of the broad concepts comprehended by the invention.

The invention claimed is:

1. In combination:
    a shopping cart comprising a frame supported on a plurality of wheels and defining:
    a) a primary storage receptacle in which articles to be purchased are placed; and
    b) a storage shelf below the primary storage receptacle upon which additional articles to be purchased can be placed; and
    c) a station at which a person can be situated to operate the processing assembly to identify information on articles from the shopping cart in the aisle; and
    d) a mirror on the other side of the aisle situated so that a person situated at the station can observe a reflection of articles placed on the storage shelf as the shopping cart is directed through the aisle path,
    the mirror having a reflective surface strategically configured and located to reflect an image of the shopping cart only below the top of the shopping cart from a vantage point of a person situated at the station to operate the processing assembly as the shopping cart is directed through the aisle path thereby to avoid reflection to a person situated at the station to operate the processing assembly of images of certain regions of a body of a customer, maneuvering the shopping cart at the station, that a customer may consider sensitive to observation.

2. The combination according to claim 1 wherein the reflective surface is convexly shaped.

3. The combination according to claim 2 wherein the mirror comprises a body on which a reflective coating is applied to define the reflective surface.

4. The combination according to claim 3 wherein the body has a convex portion projecting away from a reference plane and only a portion of the convex portion has a reflective coating thereon exposed to reflect an image.

5. The combination according to claim 4 wherein the convex portion is defined by an arc with a constant radius from a center point and the arc is interrupted at a location spaced from the reference plane.

6. The combination according to claim 4 wherein the convex portion is defined substantially by an arc with a constant radius from a center point.

7. The combination according to claim 2 wherein the convexly shaped reflective surface is defined by a portion of a sphere truncated by transverse planes.

8. The combination according to claim 3 wherein the body comprises a frame extending fully around the convexly shaped reflective surface.

9. The combination according to claim 8 wherein the frame defines a substantially flat mounting surface.

10. The combination according to claim 1 wherein the mirror is made from a non-metallic material.

11. The combination according to claim 1 wherein the processing assembly comprises a scanner for UPC codes on articles that can be placed in the shopping cart.

12. The combination according to claim 2 wherein the convexly shaped reflective surface is substantially entirely covered with the reflective coating and an area of the reflective coating on the convexly shaped reflective surface is strategically masked so that an image of the certain regions of the body of the customer that would otherwise reflect to the person situated at the station to operate the processing assembly will not be reflected at the masked area.

13. The combination according to claim 1 wherein the reflective surface is circumscribed by a diameter in the range of 5-10 inches.

14. The combination according to claim 13 wherein the diameter is on the order of 8 inches.

15. The combination according to claim 1 wherein the shopping cart has a front and rear and the mirror is configured to reflect to a person situated at the station to operate the processing assembly an image having a dimension along the path not significantly greater than a front-to-rear dimension of the shopping cart from a vantage point of a person situated at the station to operate the processing assembly.

16. The combination according to claim 3 wherein the body is shaped as a segment of a sphere.

17. The combination according to claim 3 wherein the body is shaped so that the body has one of an elliptical and a parabolic shape as seen in a planar cross section.

18. The combination according to claim 1 wherein the reflective surface has a flat shape.

19. The combination according to claim 1 wherein an area of the reflective surface is strategically masked so that an image of the certain regions of the body of the customer that would otherwise reflect to the person situated at the station to operate the processing assembly will not be reflected at the masked area.

20. The combination according to claim 19 wherein less than 50% of an entire area of the reflective surface is masked.

21. The combination according to claim 1 wherein the reflective surface is configured and located to reflect an image of the shopping cart only below the primary storage receptacle from the vantage point of a person situated at the station to operate the processing assembly as the shopping cart is directed through the aisle path.

22. In combination:
a shopping cart comprising a frame supported on a plurality of wheels and defining:
a) a primary storage receptacle in which articles to be purchased are placed; and
b) a storage shelf below the primary storage receptacle upon which additional articles to be purchased can be placed; and
a checkout location comprising:
a) an aisle through which the shopping cart can be directed in a path to and from a checkout position, the aisle having laterally spaced sides;
b) a processing assembly at one side of the aisle;
c) a station at which a person can be situated to operate the processing assembly to identify information on articles from the shopping cart in the aisle; and
d) a mirror on the other side of the aisle situated so that a person situated at the station to operate the processing assembly can observe a reflection of articles placed on the storage shelf as the shopping cart is directed through the aisle path,
the mirror having a reflective surface configured and located to reflect an image of the shopping cart only below the top of the shopping cart from a vantage point of a person situated at the station to operate the processing assembly as the shopping cart is directed through the aisle path,
wherein an area of the reflective surface is strategically masked to avoid reflection of the masked area, to a person situated at the station to operate the processing assembly, of images of certain regions of a body of a customer, maneuvering the shopping cart at the station, that a customer may consider sensitive to observation.

* * * * *

UNITED STATES PATENT AND TRADEMARK OFFICE
CERTIFICATE OF CORRECTION

PATENT NO. : 9,661,942 B2
APPLICATION NO. : 14/940275
DATED : May 30, 2017
INVENTOR(S) : Roger J. Leyden Page 1 of 1

It is certified that error appears in the above-identified patent and that said Letters Patent is hereby corrected as shown below:

In the Claims

Column 7 Line 63 through Column 8 Line 21, Claim 1 should read as:

1. In combination:
a shopping cart comprising a frame supported on a plurality of wheels and defining: a) a primary storage receptacle in which articles to be purchased are placed; and b) a storage shelf below the primary storage receptacle upon which additional articles to be purchased can be placed; and
a checkout location comprising:
a) an aisle through which the shopping cart can be directed in a path to and from a checkout position, the aisle having laterally spaced sides;
b) a processing assembly at one side of the aisle;
c) a station at which a person can be situated to operate the processing assembly to identify information on articles from the shopping cart in the aisle; and
d) a mirror on the other side of the aisle situated so that a person situated at the station can observe a reflection of articles placed on the storage shelf as the shopping cart is directed through the aisle path,
the mirror having a reflective surface strategically configured and located to reflect an image of the shopping cart only below the top of the shopping cart from a vantage point of a person situated at the station to operate the processing assembly as the shopping cart is directed through the aisle path thereby to avoid reflection to a person situated at the station to operate the processing assembly of images of certain regions of a body of a customer, maneuvering the shopping cart at the station, that a customer may consider sensitive to observation.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*